United States Patent
Error et al.

(10) Patent No.: US 8,170,993 B2
(45) Date of Patent: May 1, 2012

(54) PAGE GROUPING FOR SITE TRAFFIC ANALYSIS REPORTS

(75) Inventors: Christopher Reid Error, Orem, UT (US); Brett Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 285 days.

(21) Appl. No.: 12/248,831

(22) Filed: Oct. 9, 2008

(65) Prior Publication Data

US 2009/0037579 A1 Feb. 5, 2009

Related U.S. Application Data

(60) Division of application No. 12/022,779, filed on Jan. 30, 2008, now abandoned, which is a continuation-in-part of application No. 10/609,008, filed on Jun. 27, 2003.

(60) Provisional application No. 60/887,468, filed on Jan. 31, 2007.

(51) Int. Cl.
*G06F 7/00* (2006.01)
*G06F 17/00* (2006.01)
*G06F 15/16* (2006.01)

(52) U.S. Cl. .................. 707/649; 709/218

(58) Field of Classification Search .......... 707/649; 709/218
See application file for complete search history.

(56) References Cited

U.S. PATENT DOCUMENTS

| | | |
|---|---|---|
| 2002/0042750 A1 | 4/2002 | Morrison |
| 2002/0067360 A1 | 6/2002 | Chi et al. |
| 2002/0070953 A1 | 6/2002 | Barg et al. |
| 2002/0152284 A1* | 10/2002 | Cambray et al. ............... 709/218 |
| 2002/0165936 A1 | 11/2002 | Alston et al. |
| 2003/0023712 A1 | 1/2003 | Zhao et al. |
| 2003/0055883 A1 | 3/2003 | Wiles, Jr. |
| 2003/0115333 A1 | 6/2003 | Cohen et al. |
| 2003/0128231 A1* | 7/2003 | Kasriel et al. ................. 345/736 |
| 2003/0130982 A1 | 7/2003 | Kasriel et al. |
| 2003/0131097 A1 | 7/2003 | Kasriel et al. |
| 2004/0174397 A1 | 9/2004 | Cereghini et al. |

(Continued)

FOREIGN PATENT DOCUMENTS

JP H7-225770 8/1995

(Continued)

OTHER PUBLICATIONS

Jason I. Hong, Tim Sohn, James A. Landay, Jeffrey Heer, Tara Matthews, "What Did They Do? Understanding Clickstreams with the WebQuilt Visualization System," WebQuilt homepage http://guir.berkeley.edu/projects/webquilt/, pp. 1-7.

(Continued)

*Primary Examiner* — Apu Mofiz
*Assistant Examiner* — Chelcie Daye
(74) *Attorney, Agent, or Firm* — Robert C. Kowert; Meyertons, Hood, Kivlin, Kowert & Goetzel, P.C.

(57) ABSTRACT

Website administrators can specify page groups and/or single pages as checkpoint nodes for site analysis reporting purposes, and can configure the system of the invention to provide information as to a particular visitation path through the checkpoints. Any group of pages can be designed as a single checkpoint node for website traffic analysis and reporting purposes. Page groups can be used in place of or in addition to individual web pages in any context where site traffic analysis is being presented or performed.

26 Claims, 9 Drawing Sheets

U.S. PATENT DOCUMENTS

2004/0205594 A1 10/2004 Arora et al.
2006/0149728 A1 7/2006 Error et al.

FOREIGN PATENT DOCUMENTS

JP 200263102 2/2002
JP 2002123516 2/2002

OTHER PUBLICATIONS

Jason I. Hong, James A. Landay, "WebQuilt: A Framework for Capturing and Visualizing the Web Experience," WebQuilt, homepage: http://guir.berkeley.edu/projects/webquilt/, pp. 1-8, May 1-5, 2001.

Castillo. "Effective web crawling". PhD thesis submitted to the University of Chile, Dept. of Computer Science [online]. Published Nov. 2004. [retrieved on Jul. 3, 2008]. Retrieved from the Internet: <URL: http://www.webir.org/resources/phd/Castillo_2004.pdf>.

Nakajima, Tsunoru "Web Log Analysis Tool", Nikkei Internet Technology, Japan, Nikkei BP-sha, Aug. 22, 1998, 14th issue, pp. 122-129.

Chen et al., "Visualizing and Discovering Web Navigational Patterns". In: Proceedings of the 7th International Workshop on the Web and Databases: colocated with ACM SIGMOD/PODS 2004 [online]. Published Jun. 17, 2004, vol. 67, p. 13-18. [retrieved on Jul. 16, 2008]. Retrieved from the Internet: <URL: http://web.cs.ualberta.ca/~papersdb/uploaded_files/720/paper_web%20nav%20patterns.pdf>.

Uneda, Junji and Yokota, Haruo, "Common Sequence Analysis of Web Logs", Institute of Electronics, Information and Communication Engineers, May 17, 2002.

* cited by examiner

US 8,170,993 B2

PAGE GROUPING FOR SITE TRAFFIC ANALYSIS REPORTS

CROSS-REFERENCE TO RELATED APPLICATIONS

The present patent application claims priority as a divisional of U.S. Utility patent application Ser. No. 12/022,779, filed Jan. 30, 2008, for "Site Analysis Report", which is incorporated herein by reference and which claimed priority:

from U.S. Provisional Patent Application Ser. No. 60/887,468, filed Jan. 31, 2007, for "Site Analysis Report", which is incorporated herein by reference;

and as a continuation-in-part of U.S. Utility patent application Ser. No. 10/609,008, filed Jun. 27, 2003, for "Capturing and Presenting Site Visitation Path Data", which is incorporated herein by reference.

FIELD OF THE INVENTION

The present invention is related to website traffic analysis reports, and more particularly to techniques for grouping pages in such reports.

DESCRIPTION OF THE BACKGROUND ART

Website providers often wish to collect data that describes usage and visitation patterns for their websites and for individual web pages within the sites. Such information can be extremely valuable in developing usage statistics for various purposes, including for example estimating server load, determining advertising rates, identifying areas of websites that are in need of redesign, and the like.

When surfing the Web using a browser such as Internet Explorer (available from Microsoft Corporation of Redmond, Wash.), users have the ability to move from one page to another by various means, such as: clicking on links within pages; typing in Uniform Resource Locators (URLs); clicking on dedicated buttons in the browser (such as Back, Forward, and Home); or selecting from a list of favorites. In addition, users can open and close new browser windows at will. As users of web browsers have grown more sophisticated over the years, they have become increasingly adept at such navigation. Furthermore, as connection speeds have increased, users have become less hesitant to click on links at will, and then back up if the information presented by the link is not of interest or is of merely momentary interest.

As a result, users often take a somewhat wandering approach through pages of a website, including side trips and tangents. The user eventually reaches the end of a theoretically linear path of pages, but may have visited some tangential pages along the way. Such tangential pages may be part of the same web domain as the linear path, or they may be external to that domain.

For example, in performing a somewhat linear task such as purchasing an item from an online retailer, there are a series of steps that are generally represented by web pages: searching for the desired item; selecting the item by putting it in a shopping cart; activating a checkout function; providing shipping and billing information; and indicating final approval. However, along the way, the user may visit some tangential pages. For example, he or she may check the shipping costs on item; or he or she may check the price of the item at a competitor's page; or he or she may, for whatever reason, check the weather forecast. The linear path of pages is eventually visited, in a discernable sequence; these tangential pages are merely momentary distractions along the way.

In many contexts, website administrators are interested in analyzing the site visitation paths of users of their websites. Visitation to the tangential pages may be of little or no interest to such administrators; alternatively, administrators may be interested in certain tangents but not others.

Furthermore, it is often the case that several web pages are similar to one another in form, function, and/or content, so that a website administrator would be interested in treating such web pages as part of a group for the purposes of website traffic analysis reports. Thus, for such purposes, it would be beneficial to have a mechanism that allows a website administrator to specify that a visit to any one of the pages in such a group should be treated as equivalent to a visit to any other page in the group.

What is needed, therefore, is a system that allows website administrators to specify page groups for site analysis reporting purposes. What is further needed is a system that allows website administrators to edit, delete, and manage previously specified page groups. What is further needed is a system that generates site traffic analysis reports wherein at least one node represents a group of pages rather than a single page.

SUMMARY OF THE INVENTION

The present invention allows website administrators to specify page groups for site analysis reporting purposes. Website administrators are able to specify single pages and/or page groups as checkpoint nodes, and can configure the system of the invention to provide information as to a particular visitation path through the checkpoints. The system then presents usage statistics for the specified visitation path. According to the techniques of the present invention, the system is able to recognize a visitation path among checkpoints, regardless of whether the user visits other nodes in the course of the checkpoint traversal. Thus, even if a user takes "side trips" through other web pages that are not designated as checkpoints, the present invention is able to provide meaningful site path analysis with respect to those nodes that are designated as checkpoints. Thus, the present invention can be used to specify any group of pages as a single checkpoint node for website traffic analysis and reporting purposes.

Page groups can be used in place of or in addition to individual web pages in any context where site traffic analysis is being presented or performed. Website administrators can specify any number of page groups, and can manage such page groups as needed or desired. Thus, website administrators can name page groups, add or delete pages from them, and configure the manner in which page groups are displayed in site analysis reports.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The following description and accompanying figures are merely illustrative of the techniques of the invention. One skilled in the art will recognize that the techniques of the invention can be implemented in other ways and in other contexts wherein it is desirable to capture and analyze sequential relationships among nodes. In addition, the particular layout and appearance of the screen shots and reports provided herein are intended to be exemplary.

Figure 1:
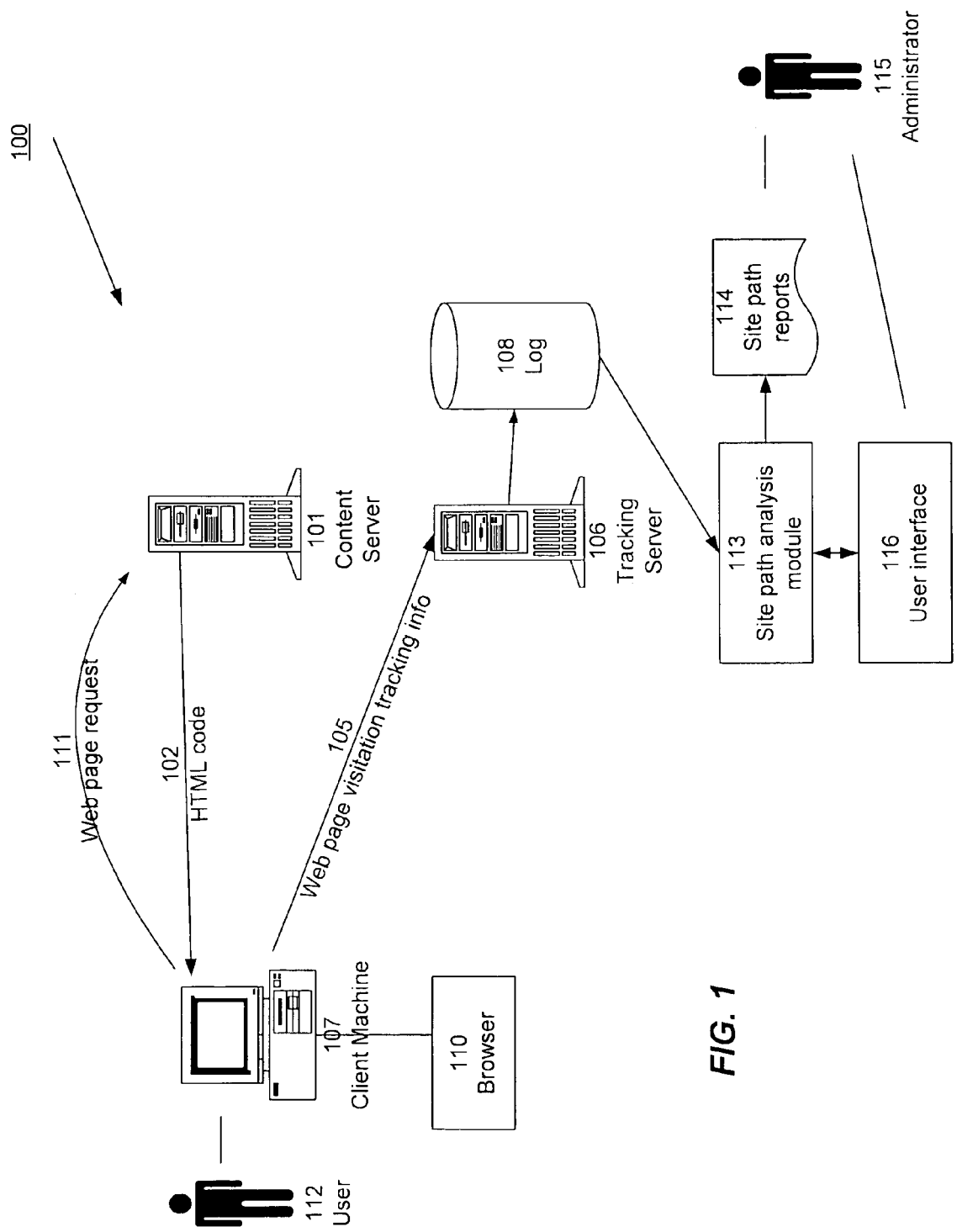
FIG. 1 is a block diagram depicting a system for website traffic data collection.

Referring now to FIG. 1, there is shown an example of a system 100 for website traffic data collection. User 112 interacts with client machine 107, which runs a software application such as browser 110 for accessing and displaying web pages. In response to a user 112 command such as clicking on a link or typing in a URL, client machine 107 issues a web page request 111 that is transmitted via the Internet to content server 101. In response to request 111, content server 101 transmits HTML code 102 to client machine 107. Browser 110 interprets received HTML code 102 to display the requested web page on client machine 107.

Client machine 107 also transmits web page visitation tracking information 105 to a tracking server 106, which is typically a separate server operated by a third-party website traffic statistic service. Tracking information 105 typically includes a user identifier, as well information describing the pages visited and the dates and times of the visits. Tracking information 105 can be transmitted from client 107 to tracking server 106 according to well-known techniques. For example, one well-known technique is to embed a pointer to a resource, known as a "web bug," in HTML code 102. The resource is typically invisible to the user, such as a transparent one-pixel image. The pointer directs machine 107 to request the resource from tracking server 106. Tracking server 106 records the request in a log 108, and records additional information associated with the request (such as the date and time, and possibly some identifying information that may be encoded in the resource request). Thus, tracking server 106 records the occurrence of a "hit" to the web page. Tracking server 106 also transmits the requests one-pixel image 109 to client machine 107 so that the resource request is satisfied.

Site path analysis module 113 retrieves stored tracking data from log 108, filters the data, and outputs reports 114 to a web administrator 115. Reports 114 may be provided in hard copy, or via a display screen (not shown), or by some other means. Administrator 115 can request particular types of reports, and can configure the filtering, analysis, and output operations via user interface 116, as will be described in more detail below. Reports 114 include, for example, overviews and statistical analyses describing the relative frequency with which various site paths are being followed through the website. Examples of such reports are described below.

Module 113 and user interface 116 may be implemented in software running on server 106 or on another computer that can access log 108. In one embodiment, the present invention is implemented primarily within module 113 and user interface 116.

Figure 3:
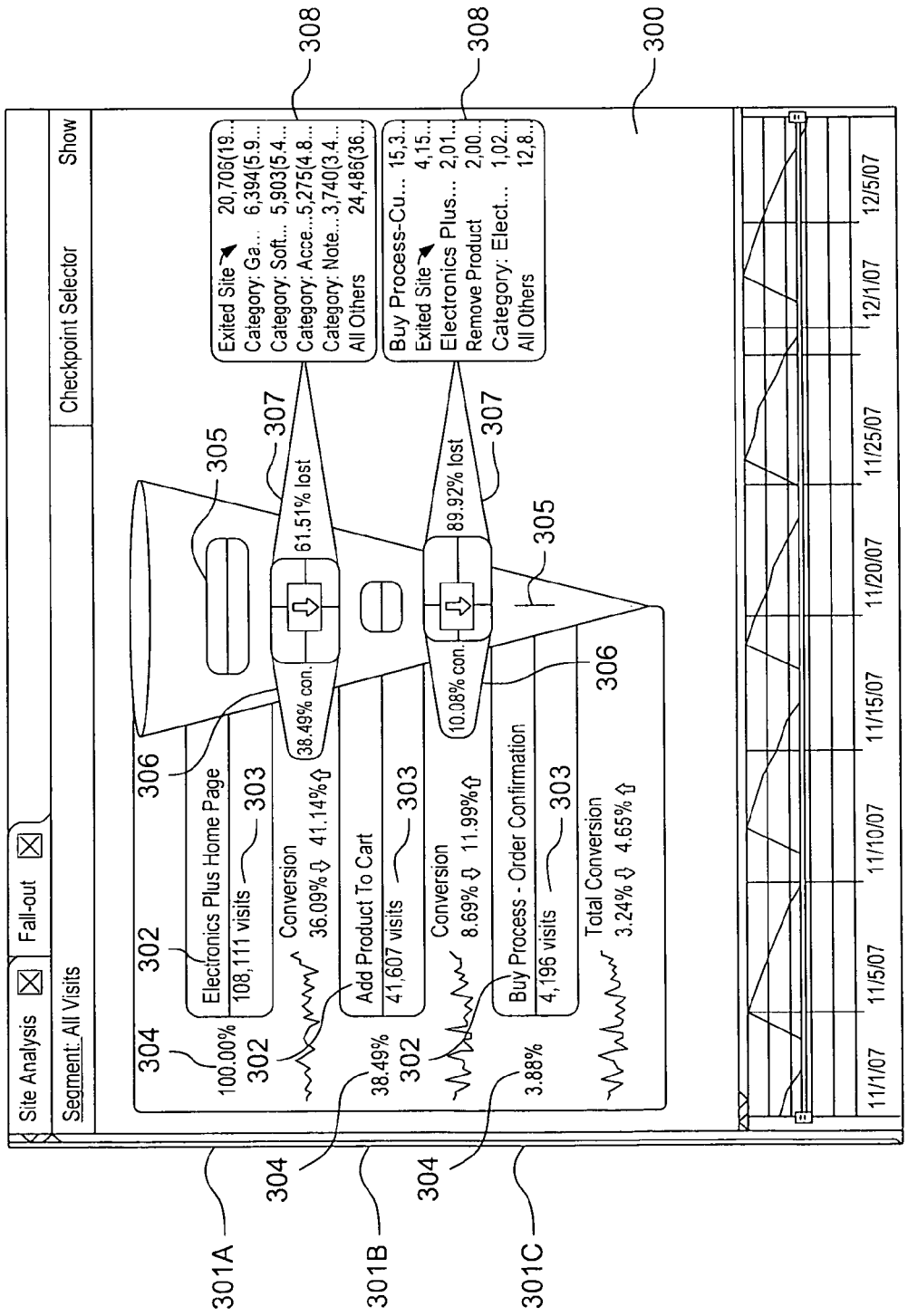
FIG. 3 depicts a user interface for presenting a fall-out report for a website traffic analysis system.

Referring now to FIG. 3, there is shown an example of a fall-out report 300 for a website traffic analysis system. A fall-out report 300 is designed to show how website visitors tend to navigate through a website. Various checkpoints can be defined, as described in related U.S. Utility patent application Ser. No. 10/609,008, filed Jun. 27, 2003, for "Capturing and Presenting Site Visitation Path Data", which is incorporated herein by reference. Fall-out report 300 provides a visual indication of the number of users that follow the specified path of checkpoints. As described in related U.S. Utility patent application Ser. No. 10/609,008, additional pages may be visited along the path; if those pages are not designated as checkpoints, they are ignored for purposes of the fall-out report 300.

In the example of FIG. 3, three checkpoints 301A, 301B, 301C have been defined. Each checkpoint 301 corresponds to a web page within the website that is being analyzed. For each checkpoint 301, the following information is displayed:

- a label 302;
- a number of visits 303 that have followed the defined path up to the current checkpoint 301;
- of the total number of visits to the first checkpoint on the path, a percentage 304 of visits that have remained on the path up to and including the current checkpoint 301; and
- a graphical indication 305 of the relative number of visits that have remained on the path up to and including the current checkpoint 301.

For each checkpoint 301 after the first checkpoint, the following information is displayed:

- of the total number of visits to the previous checkpoint node on the path, a percentage 306 of visits that proceeded to the current checkpoint 301;
- of the total number of visits to the previous checkpoint node on the path, a percentage 307 of visits that did not proceed to the current checkpoint 301 (i.e., that were "lost"); and
- of those visits that were lost, an indication 308 of where the website visitor went after visiting the previous checkpoint node on the path Other information can also be shown in the fall-out report 300. One skilled in the art will recognize that the example shows a particular layout for such a report, but that many other layouts are possible.

Figure 4:
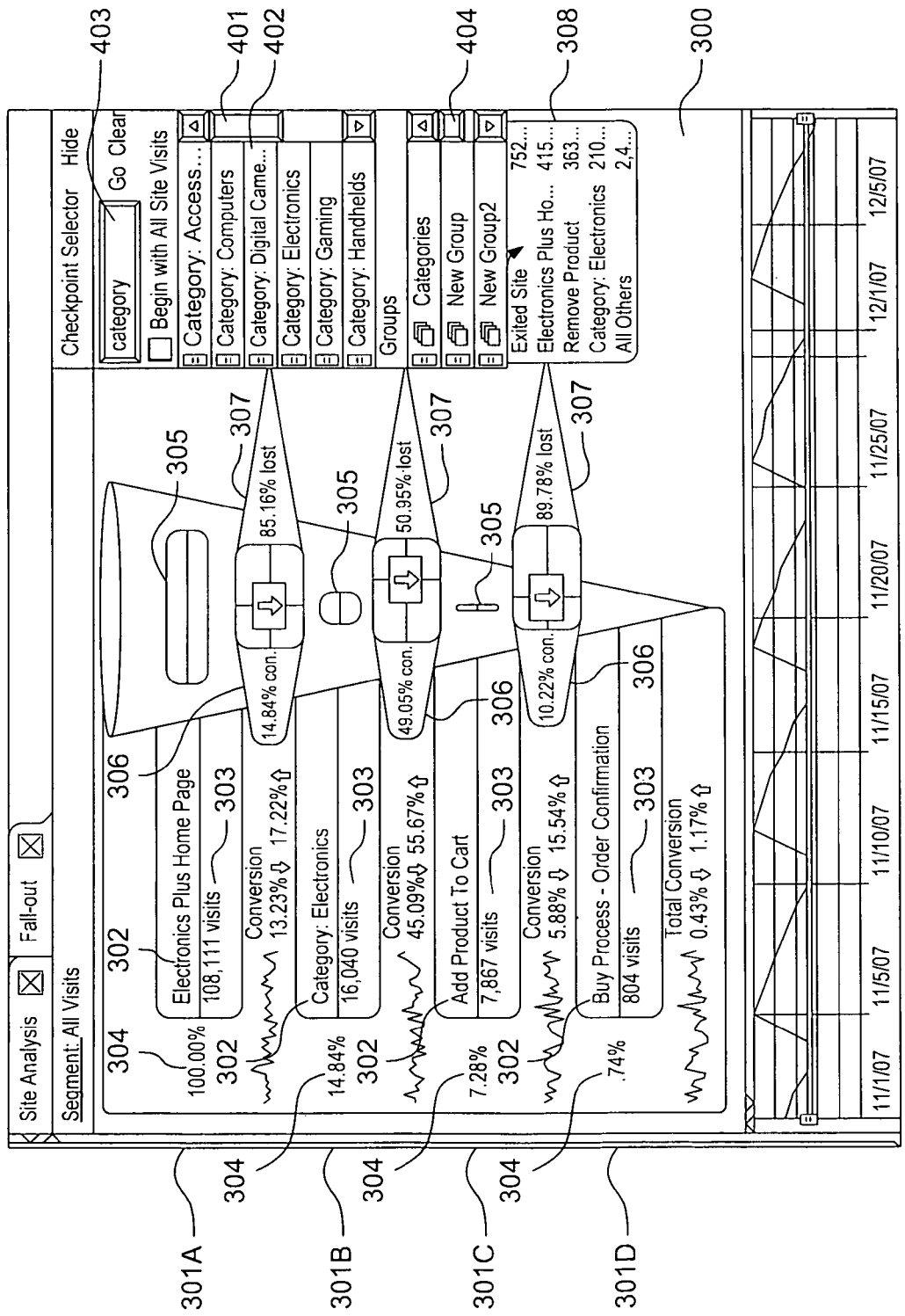
FIG. 4 depicts a user interface for presenting a fall-out report for a website traffic analysis system after a page has been added as a checkpoint node.

The report 300 of FIG. 3 shows information for a checkpoint path including a home page 301A, an "Add product to cart" page 301B, and a "Buy process—Order confirmation" page 301C. If the website includes various category pages, each showing a product category, a site administrator may wish to see how visits to these category pages may affect site traversal statistics. Accordingly, the administrator may wish to add a category page to the checkpoint path of FIG. 3. Referring now to FIG. 4, there is shown an example of fall-out report 300 after the administrator has added a "Category: Electronics" checkpoint 301D between checkpoints 301A and 301B. FIG. 4 also shows a checkpoint selector 401 interface that provides a list 402 of checkpoints that can be dragged onto the desired location within report 300. The administrator can also type a search query in field 403 to filter the list 402 of checkpoints. FIG. 4 also shows a list 404 of checkpoint groups, which will be described in more detail below.

In some cases, the administrator may be interested in the effect, on site traversal statistics, of other pages similar to the "Category: Electronics" page. If desired, the administrator can add corresponding checkpoints to fall-out report 300, and can see the effect of such checkpoints on report 300. For example, a "Category: Gaming" checkpoint (not shown) could be added just below or above the "Category: Electronics" checkpoint 301D, so that the report would show statistics for a traversal path including both the "Category: Electronics" page and the "Category: Gaming" page in whatever order is specified.

The present invention also allows the administrator to generate a report for a traversal path that includes a visit to either the "Category: Gaming" page or the "Category: Electronics" page, without requiring a visit to both of these pages. To do so, the administrator creates a page group. The page group includes both of the pages, and acts as a single node, or checkpoint, within the fall-out report. The administrator can then create a target path including the checkpoint representing the page group. A visit to any page in the group will satisfy the conditions for the checkpoint, and will be considered a visit to the checkpoint for reporting purposes. The administrator can give the group a name, can add or remove pages from the group, and can perform other editing operations on the group, as shown below.

Figure 2:
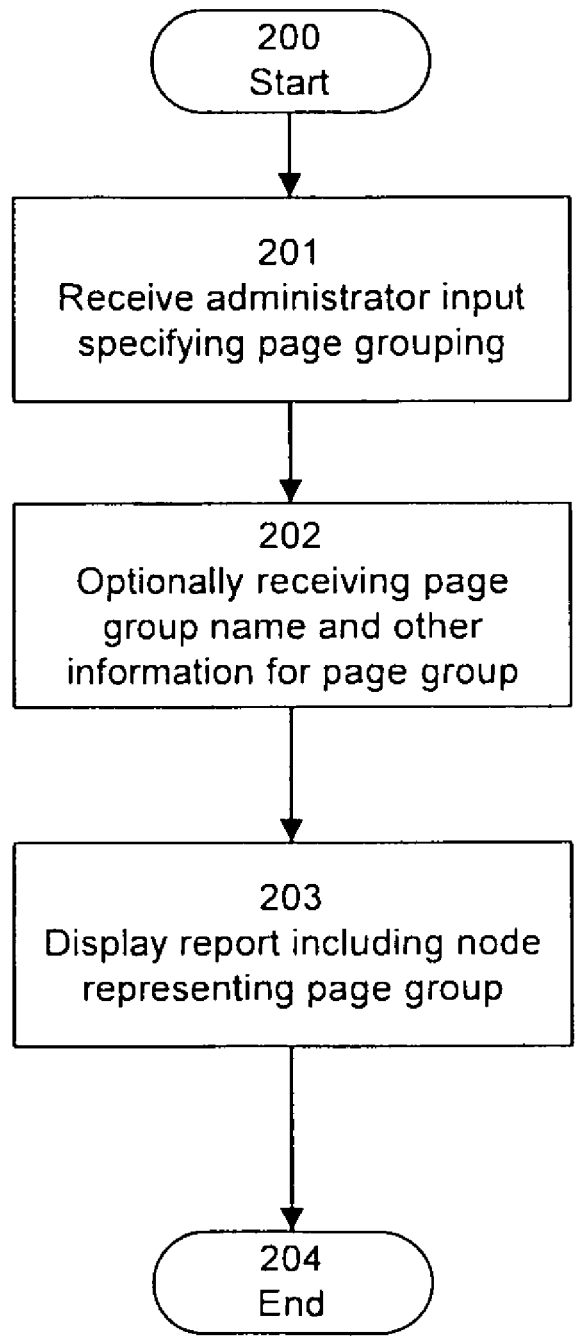
FIG. 2 is a flowchart depicting a method of specifying a group of pages for a website traffic analysis system according to one embodiment of the present invention.

Referring now to FIG. 2, there is shown a flowchart depicting a method for specifying a group of pages for a website traffic analysis system according to one embodiment of the present invention. In one embodiment, the steps of FIG. 2 are performed by site path analysis module 113 in the process of generating site path reports 114. Module 113 receives 201 input from administrator 115 or from another individual, specifying that two or more pages should be considered part of a group for purposes of a site path report 114. Additional information for the page group can be received 202, including a name for the group, search parameters, and the like, as will be described in more detail below. Once the information for the page group has been provided, the site path report 114 is displayed 203. As shown in the examples discussed below, the report 114 includes at least one node that represents a page group as specified by the administrator in step 201. The report 114 displayed in step 203 can be any type of website traffic analysis report, including for example a fall-out report, a site analysis report, or the like.

Figure 5:
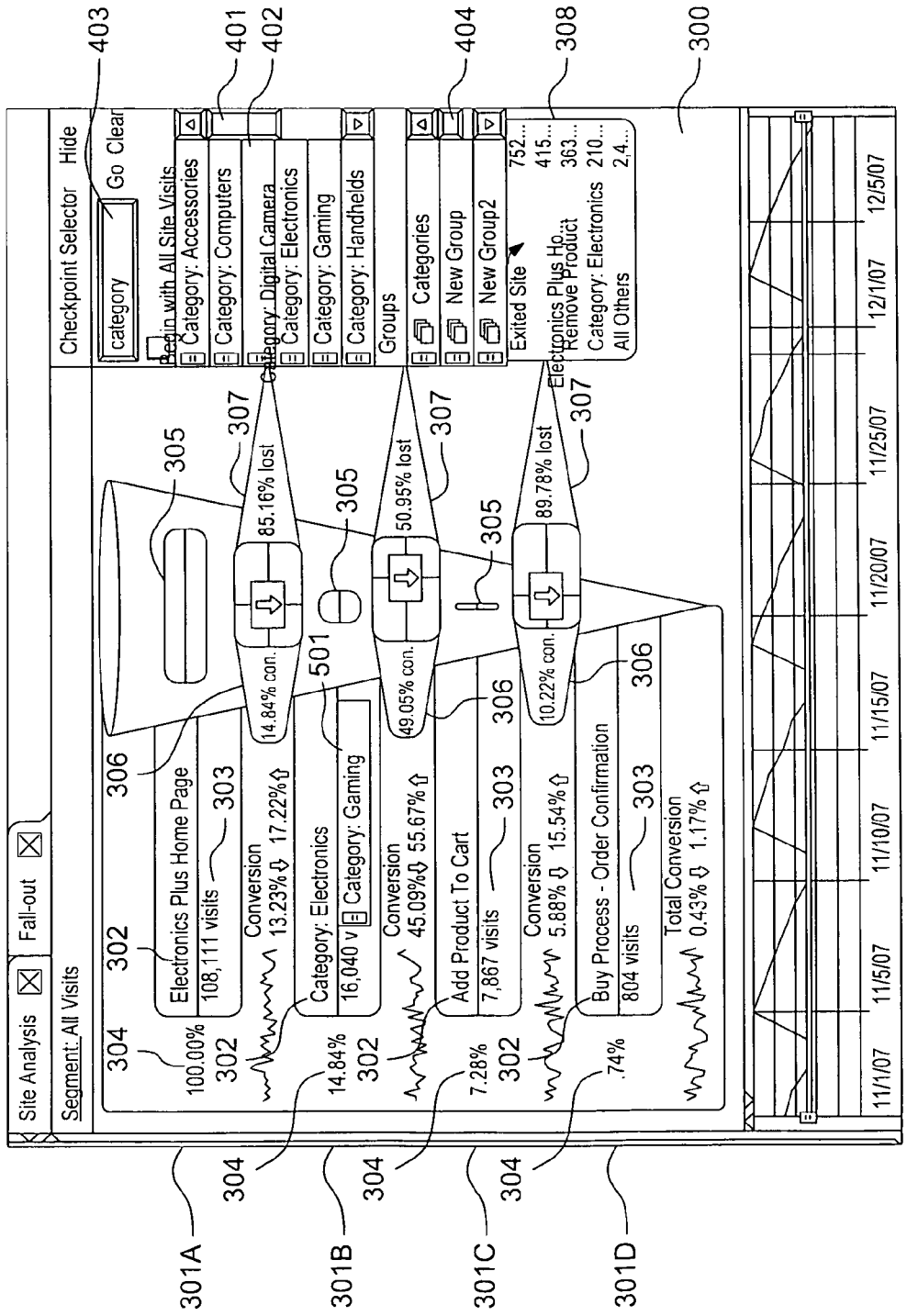
FIG. 5 depicts a user interface for specifying a page group for a website traffic analysis system according to one embodiment of the present invention.

Referring now to FIG. 5, there is shown a user interface for specifying a page group for a website traffic analysis system according to one embodiment of the present invention. In one embodiment, the administrator specifies a page group by dragging a checkpoint 501 from checkpoint list 402. Checkpoint list 402 is shown in FIG. 5 as part of checkpoint selector 401. List 402 includes all available checkpoints, or it can be filtered by entering a search query in field 403. The user drags the desired checkpoint 501 onto checkpoint 301B to create a group including the checkpoint 501 being dragged and the checkpoint 301B at the location where the user completes the dragging operation. Similarly, the administrator can add a page to an existing page group by dragging a checkpoint 501 from checkpoint list 402 onto an existing page group in report 300.

In the example of FIG. 5, the administrator has dragged the "Category: Gaming" checkpoint 501 from list 402 onto "Category: Electronics" checkpoint 301B, thus initiating the process of creating a new page group including both the "Category: Gaming" page and the "Category: Electronics" page.

Figure 6:
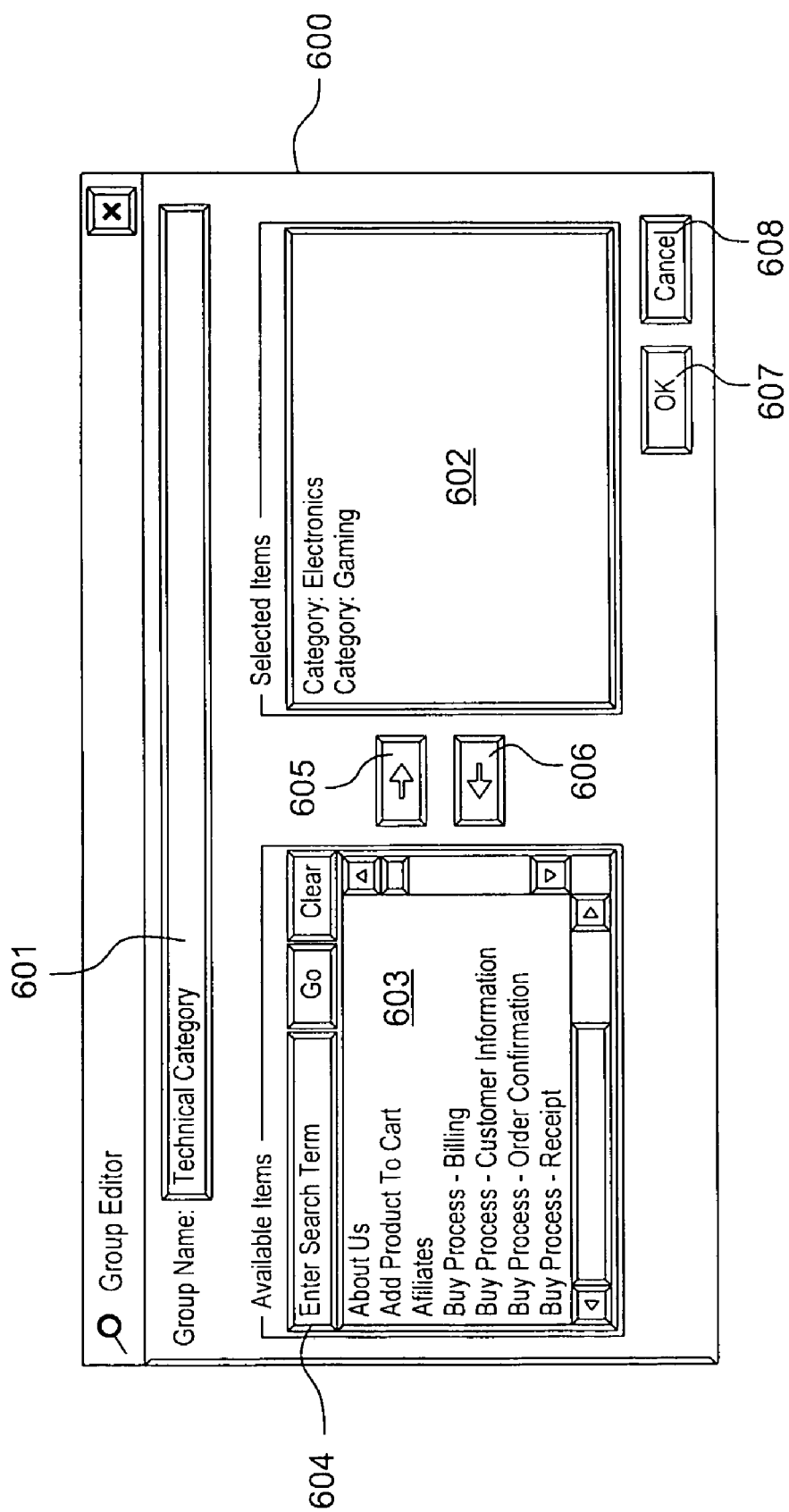
FIG. 6 depicts a user interface for editing information associated with a page group according to one embodiment of the present invention.

In one embodiment, when a new page group is created, the administrator is given an opportunity to specify a name and additional information for the page group. Referring now to FIG. 6, there is shown a group editor dialog box 600 that appears when a new page group is created, according to one embodiment. In other embodiments, dialog box 600 is not presented automatically upon creation of a new group, but may be activated by the administrator when desired. Thus, the new group is given a default name that can be edited later if desired. The administrator can also activate dialog box 600 by initiating a command, for example via an on-screen menu or keyboard shortcut.

Group editor dialog box 600 includes a field 601 for entering a name for the group; in the example of FIG. 6, the administrator has entered the name "Technical Category" for the newly created group. Dialog box 600 also includes a list 602 of pages currently in the group. As shown in the example of FIG. 6, list 602 includes the "Category: Electronics" page and the "Category: Gaming" page. List 603 includes available pages that can be added to the group. The administrator can enter a search query in field 604 to filter list 603. The administrator can select a page from list 603 and click on button 605 to add the selected page to the group; the selected page is then added to list 602. The administrator can select a page from list 602 and click on button 606 to remove the selected page from the group; the selected page is then removed from list 602.

The administrator clicks OK button 607 to accept the changes to the group and dismiss dialog box 600. Alternatively, the administrator can click Cancel button 608 to dismiss dialog box 600 without making the specified changes to the group.

Figure 7:
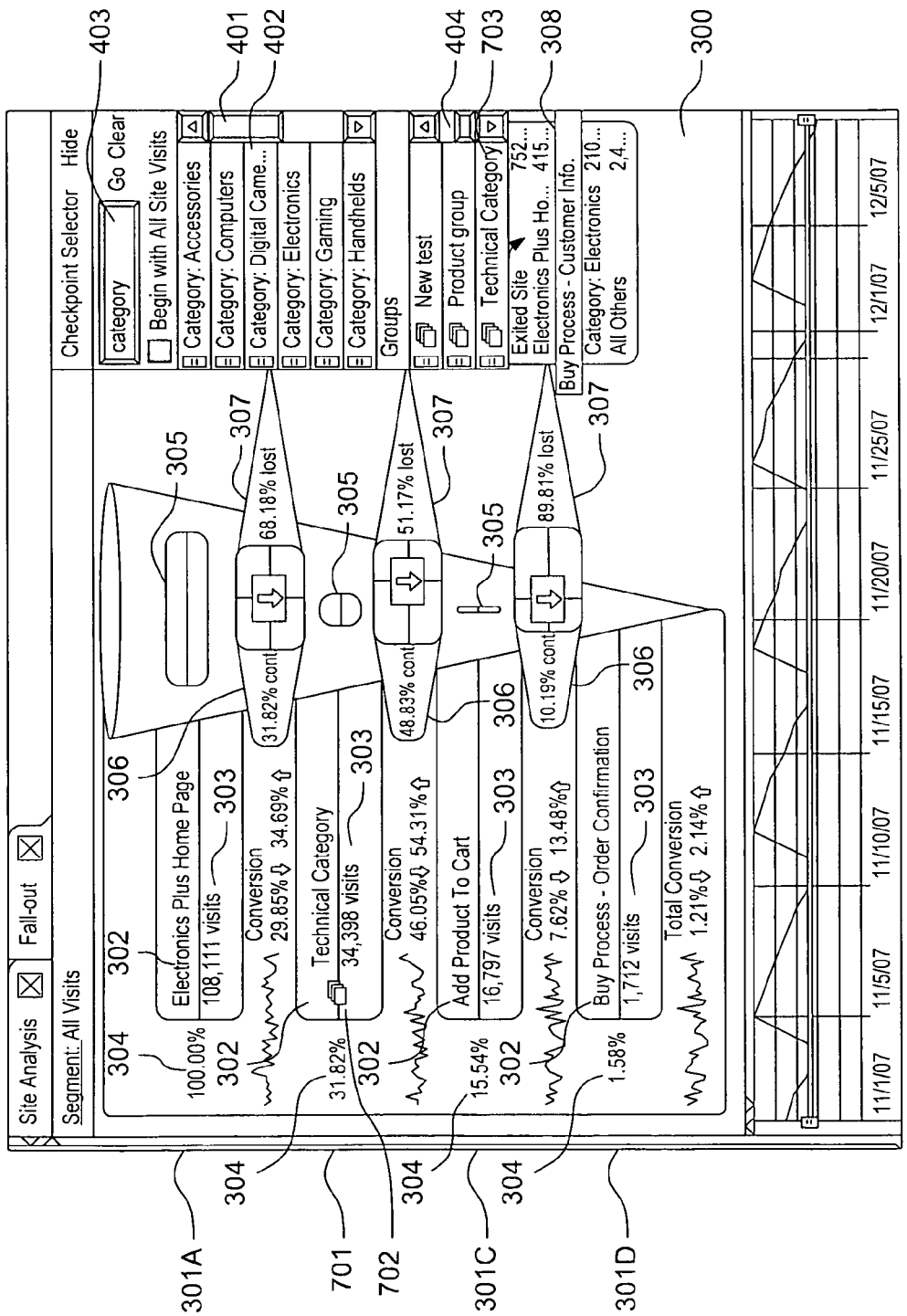
FIG. 7 depicts a user interface for presenting a fall-out report for a website traffic analysis system, including a page group as a checkpoint node, according to one embodiment of the present invention.

Referring now to FIG. 7, there is shown fall-out report 300 after the page group has been created. Now, the page group is shown as checkpoint node 701, with a special icon 702 indicating that it is a group rather than a single page. For purposes of report 300 as shown in FIG. 7, any visit to a page within the Technical Category group is considered equivalent. For example, the statistic showing 34,398 visits for the path including the Electronics Plus home page 301A and the Technical Category group 701 includes those website visitors that visited any page within the Technical Category group after visiting the Electronics Plus home page. The Technical Category group also appears as an item 703 in group list 404, allowing the user to access this group in the future, for example to drag it to a new report or to edit it.

Figure 8:
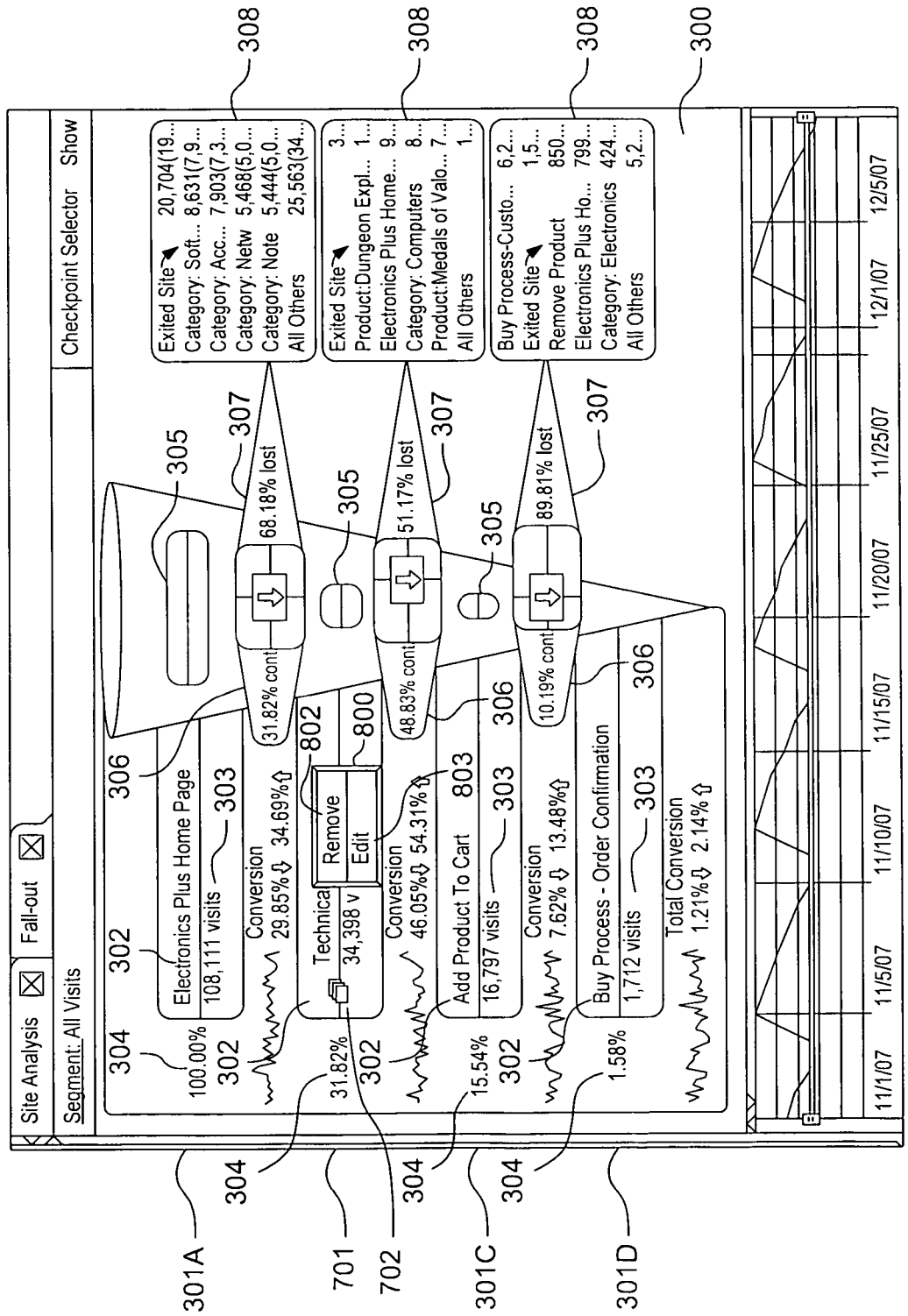
FIG. 8 depicts a pop-up menu for accessing a screen for editing information associated with a previously created page group according to one embodiment of the present invention.

The administrator can right-click on group 701 within report 300 to perform actions on group 701, for example to remove it from report 300 or to edit the group. In one embodiment, a pop-up menu appears when the administrator right-clicks on group 701 within report 300. Referring now to FIG. 8, there is shown an example of a pop-up menu 800 for accessing a screen for editing information associated with a previously created page group according to one embodiment of the present invention. The administrator can select Remove 802 to remove group 701 from report 300. The administrator can select Edit 803 to access dialog box 600 as shown in FIG. 6 to perform other operations on group 701.

In one embodiment, visits to multiple pages within a page group are considered a single visit for statistical purposes. In another embodiment, each visit to a page within the group is counted separately.

Figure 9:
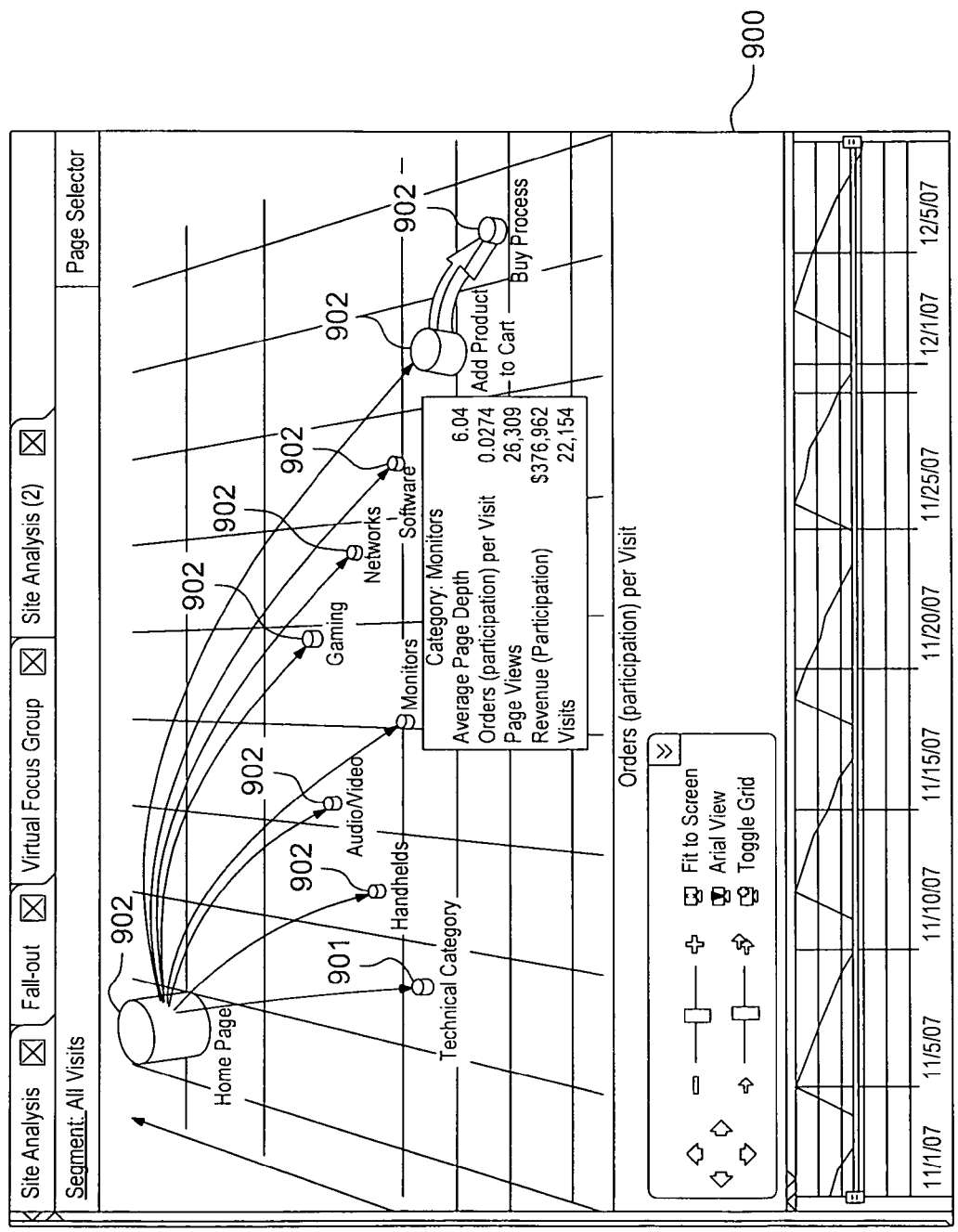
FIG. 9 depicts a user interface for presenting a site analysis report for a website traffic analysis system, including a page group as a node, according to one embodiment of the present invention.

The above examples show the operation of the present invention in the context of a fall-out report. However, one skilled in the art will recognize that the page grouping techniques described herein can be used for any report where nodes or checkpoints representing web pages are shown. In application to such alternative contexts, the present invention allows any node within such a report to represent a single web page or a page group that can be defined by an administrator. Referring now to FIG. 9, there is shown an example of a site analysis report 900 for a website traffic analysis system, including a page group 901 as a node, according to one embodiment of the present invention. Page group 901 is shown along with other nodes 902 representing individual pages. The administrator can specify page groups 901 in the context of site analysis report 900 in a manner similar to that described above for the fall-out report 300, for example by dropping one node 902 onto another node 902 or onto a page group 901, and/or by right-clicking on a page group 901 to access a group editor dialog box 600.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method for capturing and presenting node sequence data, the method comprising:

providing a first user interface display area displaying a target path comprising a sequence of checkpoint nodes in a defined order, wherein each of the checkpoint nodes comprises at least one checkpoint representing at least one network location such that the target path is indicative of a sequential traversal of network locations;

providing a second user interface display area displaying a checkpoint list comprising a plurality of user selectable checkpoints, wherein each of the checkpoints of the checkpoint list is associated with at least one network location, and wherein each of the checkpoints of the checkpoint list is selectable to generate a new checkpoint node comprising the selected checkpoint or to add the selected checkpoint to an existing checkpoint node of the target path, wherein the first user interface display area and the second user interface display are simultaneously displayed such that user may view the target path and checkpoint list simultaneously;

receiving a user input indicative of a selection of a checkpoint of the checkpoint list and a selection of an existing checkpoint node of the target path to add the selected checkpoint to, wherein the checkpoint node selected already comprises at least one checkpoint representing at least one network location;

in response to receiving the user input:
adding the checkpoint selected to the checkpoint node selected such that checkpoint node selected comprises a group checkpoint node representing a group of network locations; and
displaying, in the first user interface display area, a modified target path comprising the group checkpoint node;
retrieving, from a stored log, a plurality of records comprising node sequence data;
filtering the retrieved records to identify a subset of the retrieved records as matching the modified target path, wherein filtering the retrieved records comprises, for each retrieved record:
a) determining whether the retrieved record includes a sequence of nodes that matches the sequence of checkpoint nodes in the defined order of the modified target path, wherein a sequence of nodes that matches the sequence of checkpoint nodes comprises, for each checkpoint node of the modified target path, at least one node associated with one or more network locations that match one or more network locations represented by the respective checkpoint node, wherein a node of the retrieved sequence of nodes that matches the group checkpoint node comprises a network location that matches any of the network locations of the group of network locations represented by the group checkpoint node;
b) if the determining step is resolved in the affirmative, identifying the record as matching the modified target path; and
c) if the determining step is resolved in the negative, not identifying the record as matching the modified target path; and
outputting a report based on the records identified as matching the modified target path.

2. The method of claim 1, wherein the node sequence data comprises website visitation path data.

3. The method of claim 2, further comprising, prior to retrieving the plurality of records:
monitoring web page visits; and
storing, in the log, records representing the monitored web page visits.

4. The method of claim 1, wherein outputting the report comprises outputting a report indicating relative frequencies of occurrence of node sequences.

5. A system for capturing and presenting node sequence data, the system comprising:
a log, for storing a plurality of records comprising node sequence data;
a user interface for displaying:
a first user interface display area displaying a target path comprising a sequence of checkpoint nodes in a defined order, wherein each of the checkpoint nodes comprises at least one checkpoint representing at least one network location such that the target path is indicative of a sequential traversal of network locations; and
a second user interface display area displaying a checkpoint list comprising a plurality of user selectable checkpoints, wherein each of the checkpoints of the checkpoint list is associated with at least one network location, and wherein each of the checkpoints of the checkpoint list is selectable to generate a new checkpoint node comprising the selected checkpoint or to add the selected checkpoint to an existing checkpoint node of the target path,
wherein the first user interface display area and the second user interface display are simultaneously displayed such that user may view the target path and checkpoint list simultaneously;
an input device, for receiving user input indicative of a selection of a checkpoint of the checkpoint list and a selection of an existing checkpoint node of the target path to add the selected checkpoint to, wherein the checkpoint node selected already comprises at least one checkpoint representing at least one network location;
wherein, in response to receiving the user input:
the checkpoint selected is added to the checkpoint node selected such that checkpoint node selected comprises a group checkpoint node representing a group of network locations; and
a modified target path comprising the group checkpoint node is displayed, in the first user interface display area;
a path analysis module, coupled to the log and to the input device, for retrieving records from the log and for filtering the retrieved records to identify a subset of the retrieved records as matching the modified target path, wherein filtering the retrieved records comprises for each retrieved record:
a) determining whether the retrieved record includes a sequence of nodes that matches the sequence of checkpoint nodes in the defined order of the modified target path, wherein a sequence of nodes that matches the sequence of checkpoint nodes comprises, for each checkpoint node of the modified target path, at least one node associated with one or more network locations that match one or more network locations represented by the respective checkpoint node, wherein a node of the retrieved sequence of nodes that matches the group checkpoint node comprises a network location that matches any of the network locations of the group of network locations represented by the group checkpoint node;
b) if the determining step is resolved in the affirmative, identifying the record as matching; and
c) if the determining step is resolved in the negative, not identifying the record as matching; and
an output device, coupled to the path analysis module, for outputting a report based on the identified records.

6. The system of claim 5, wherein the node sequence data comprises website visitation path data.

7. The system of claim 6, further comprising:
a tracking server, coupled to the log, for monitoring web page visits and for transmitting a signal to the log to store records representing the monitored web page visits.

8. The system of claim 5, wherein the output device outputs a report indicating relative frequencies of occurrence of node sequences.

9. The method of claim 2, wherein outputting a report comprises generating a website traffic analysis report comprising at least one node representing a page group, wherein each node representing a page group indicates aggregate visitation statistics for the pages in the page group.

10. The method of claim 9, wherein generating a website traffic analysis report comprises generating a report indicating a quantity of website visitors traversing a path from a first node to a second node, wherein at least one of the nodes comprises a page group.

11. The method of claim 9, wherein generating a website traffic analysis report comprises generating a report indicating a quantity of website visitors traversing a path from a page belonging to a page group represented by a first node to a page belonging to a page group represented by a second node.

13. The method of claim 9, further comprising:
receiving input specifying a name for a page group; and
wherein generating the website traffic analysis report comprises generating a report identifying the page group by the specified name.

13. The method of claim 1, wherein receiving user input indicative of a selection of a checkpoint of the checkpoint list and a selection of an existing checkpoint node of the target path to add the selected checkpoint comprises receiving input dragging a representation of a first page of the checkpoint list onto a representation of a second page of the existing checkpoint to specify a page group of the group checking point node comprising the first and second pages.

14. The method of claim 9, wherein the generated website traffic analysis report comprises at least one node representing a single page.

15. The system of claim 6, wherein the output device outputs a website traffic analysis report comprising at least one node representing a page group, wherein each node representing a page group indicates aggregate visitation statistics for the pages in the page group.

16. The system of claim 15, wherein the report indicates a quantity of website visitors traversing a path from a first node to a second node, wherein at least one of the nodes comprises a page group.

17. The system of claim 15, wherein the report indicates a quantity of website visitors traversing a path from a page belonging to a page group represented by a first node to a page belonging to a page group represented by a second node.

18. The system of claim 15, wherein the generated website traffic analysis report comprises at least one node representing a single page.

19. A computer program product for capturing and presenting node sequence data, the computer program product comprising:
a computer-readable storage medium; and
computer program code, encoded on the medium, for:
displaying:
a first user interface display area displaying a target path comprising a sequence of checkpoint nodes in a defined order, wherein each of the checkpoint nodes comprises at least one checkpoint representing at least one network location such that the target path is indicative of a sequential traversal of network locations; and
a second user interface display area displaying a checkpoint list comprising a plurality of user selectable checkpoints, wherein each of the checkpoints of the checkpoint list is associated with at least one network location, and wherein each of the checkpoints of the checkpoint list is selectable to generate a new checkpoint node comprising the selected checkpoint or to add the selected checkpoint to an existing checkpoint node of the target path,
wherein the first user interface display area and the second user interface display are simultaneously displayed such that user may view the target path and checkpoint list simultaneously;
receiving user input indicative of a selection of a checkpoint of the checkpoint list and a selection of an existing checkpoint node of the target path to add the selected checkpoint to, wherein the checkpoint node selected already comprises at least one checkpoint representing at least one network location;
wherein, in response to receiving the user input:
the checkpoint selected is added to the checkpoint node selected such that checkpoint node selected comprises a group checkpoint node representing a group of network locations; and
a modified target path comprising the group checkpoint node is displayed, in the first user interface display area;
retrieving, from a stored log, a plurality of records comprising node sequence data;
filtering the retrieved records to identify a subset of the retrieved records as matching the modified target path; wherein filtering the retrieved records comprises, for each retrieved record:
a) determining whether the retrieved record includes a sequence of nodes that matches the sequence of checkpoint nodes in the defined order of the modified target path, wherein a sequence of nodes that matches the sequence of checkpoint nodes comprises, for each checkpoint node of the modified target path, at least one node associated with one or more network locations that match one or more network locations represented by the respective checkpoint node, wherein a node of the retrieved sequence of nodes that matches the group checkpoint node comprises a network location that matches any of the network locations of the group of network locations represented by the group checkpoint node;
b) if the determining step is resolved in the affirmative, identifying the record as matching the modified target path; and
c) if the determining step is resolved in the negative, not identifying the record as matching the modified target path; and
outputting a report based on the records identified as matching the modified target path 20. The computer program product of claim 19, wherein the computer program code for outputting the report comprises computer program code for outputting a report indicating relative frequencies of occurrence of node sequences.

21. The computer program product of claim 19, wherein the node sequence data comprises website visitation path data.

22. The computer program product of claim 21, further comprising, computer program code for, prior to retrieving the plurality of records:
monitoring web page visits; and
storing, in the log, records representing the monitored web page visits.

23. The computer program product of claim 21, wherein the computer program code for outputting a report comprises computer program code for generating a website traffic analysis report comprising at least one node representing a page group, wherein each node representing a page group indicates aggregate visitation statistics for the pages in the page group.

24. The computer program product of claim 23, wherein the computer program code for generating a website traffic analysis report comprises computer program code for generating a report indicating a quantity of website visitors traversing a path from a first node to a second node, wherein at least one of the nodes comprises a page group.

25. The computer program product of claim 19, wherein receiving user input indicative of a selection of a checkpoint of the checkpoint list and a selection of an existing checkpoint node of the target path to add the selected checkpoint to comprises receiving input dragging a representation of a first page of the checkpoint list onto a representation of a second page of the existing checkpoint to specify a page group of the group checking point node comprising the first and second pages.

26. The system of claim 5, wherein receiving user input indicative of a selection of a checkpoint of the checkpoint list and a selection of an existing checkpoint node of the target path to add the selected checkpoint to comprises receiving input dragging a representation of a first page of the checkpoint list onto a representation of a second page of the existing checkpoint to specify a page group of the group checking point node comprising the first and second pages.

* * * * *